United States Patent [19]

Kudo et al.

[11] 3,954,903
[45] May 4, 1976

[54] IMPACT-RESISTANT RESIN COMPOSITION

[75] Inventors: Teizo Kudo; Yoshio Hashizume; Masanori Itoh; Makoto Shiga, all of Ohimachi, Japan

[73] Assignee: Daicel Ltd., Osaka, Japan

[22] Filed: Oct. 10, 1974

[21] Appl. No.: 513,541

[30] Foreign Application Priority Data

Oct. 13, 1973 Japan.......................... 48-115194

[52] U.S. Cl............................ 260/873; 260/880 R
[51] Int. Cl.$^2$......................................... C08L 67/06
[58] Field of Search........................ 260/873, 880 R

[56] References Cited
UNITED STATES PATENTS 3,515,774  5/1970  Lee .................... 260/880 R
3,577,478  5/1971  Thorpe ................... 260/873

Primary Examiner—Murray Tillman
Assistant Examiner—J. Ziegler
Attorney, Agent, or Firm—Woodhams, Blanchard and Flynn

[57] ABSTRACT

A new impact-resistant ABS resin composition is disclosed comprising (1) 100 parts by weight of a graft copolymer of vinyl aromatic monomer and vinyl cyanide monomer, said copolymer being grafted onto butadiene rubber particles of a size of from 0.5 to 2.0 $\mu$ dispersed in the graft copolymer and (2) 1 to 10 parts by weight of a straight chain saturated polyester having an average molecular weight of from 1000 to 50000. The composition is prepared by the bulk-suspension two stage polymerization of vinyl aromatic monomer and vinyl cyanide monomer in the presence of butadiene rubber component. The polyester is incorporated during either the bulk polymerization stage or the suspension polymerization stage, or it is blended with the ABS polymer after the two stage polymerization is completed.

12 Claims, 1 Drawing Figure

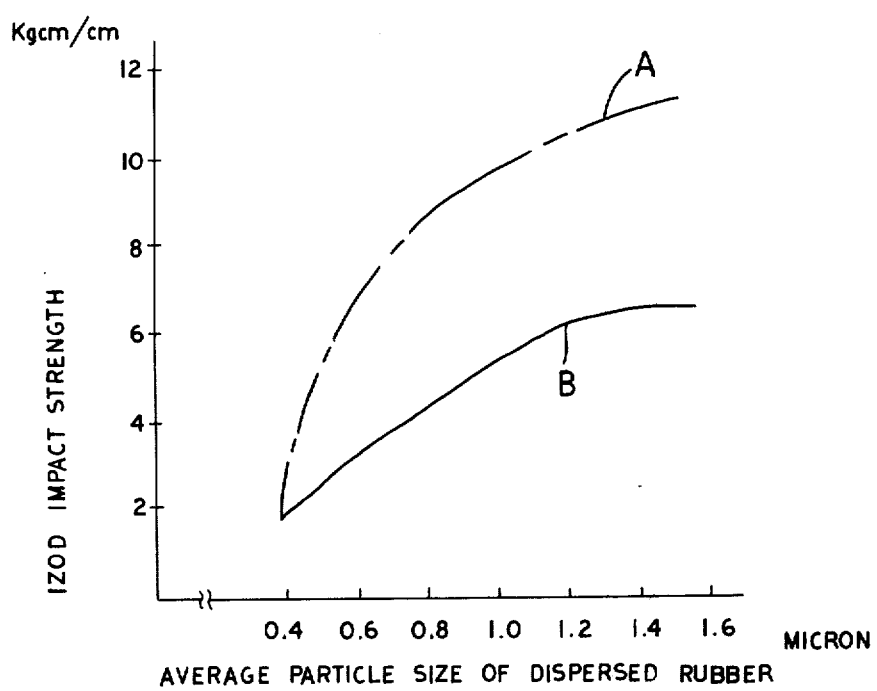
RELATIONSHIP BETWEEN AVERAGE PARTICLE SIZE OF DISPERSED RUBBER AND IZOD IMPACT STRENGTH

IMPACT-RESISTANT RESIN COMPOSITION

BACKGROUND OF THE INVENTION

1. Field of the Invention

This invention relates to an impact-resistant resin composition which is capable of being powder-molded even under low-shear conditions to produce molded products of high impact strength.

2. Description of the Prior Art

Unlike the extrusion or injection molding processes, the conventional powder-molding process involes fusing resin powder under conditions of low shear. Some processes include the known rotary molding process, the rock-and-roll process, the Heisler process, the Engel process and the sinter process.

Powder-molding is most suitable for molding large sized articles and hollow articles having an intricate shape. It is economical and versatile in its applicability to the production of products of a variety of shapes and in small quantities. For these reasons the method is coming into more general use.

Plastic materials suitable for use in powder molding are polyethylene resins, polyvinyl chloride resins, nylon resins, polycarbonate resins, polyacetal resins, polystyrene resins, high impact polystyrene resins and ABS resins.

All the above materials require careful operation in the manufacture of articles by powder molding. For instance, in rotationally molding ABS resin in the form of powder of general purpose grade into products of good appearance, care must be taken to regulate the resin's particle size, to use precisely designed molds, and to control the temperature strictly, so as to obtain products of acceptable appearance. Even when this careful molding is followed, the product is still liable to be brittle and to have insufficient impact strength, compared with that originally possessed by the ABS resin. Accordingly, there is a need to improve the physical properties of such molded articles intended for practical use.

Accordingly, the inventors have conducted research in the field of powder molding ABS resin seeking to discover a composition having good moldability and high impact resistance. Our prior discoveries concerning this are disclosed in United States patent application Ser. No. 378,255, filed July 11, 1973, now abandoned and replaced by continuation application Ser. No. 566 787, filed Apr. 10, 1975, the entire contents of which are incorporated herein by reference.

According to that invention we had discovered that a mixture of a vinyl aromatic monomer, vinyl cyanide monomer, and a butadiene rubber component together with a straight chain saturated polyester, when polymerized by the two-stage bulk and suspension polymerization processes, gives a rubber-modified ABS resin having improved impact resistance, and furthermore, the final ABS resin composition, when powder-molded, provides molded articles having generally acceptable physical properties and improved strength.

BRIEF STATEMENT OF THE INVENTION

This invention is based on the discoveries that the particle size of the rubber component in such a composition is critically related to the impact strength of the resulting resin, whereby a composition of unexpected impact strength can be produced, provided that the particle size of the rubber particles is maintained within the range of 0.5 to 2.0 microns; and that this unexpected improvement in impact strength is even further improved to an unexpected degree in the presence of a straight chain saturated polyester.

This invention relates to a novel resin composition, based on these discoveries, which composition is a novel impact-resistant ABS resin composition comprising 100 parts by weight of a graft copolymer of vinyl aromatic monomer and vinyl cyanide monomer, said copolymer being grafted onto butadiene rubber particles of a size of from 0.5 to 2.0 microns dispersed in the graft copolymer, and 1 to 10 parts by weight of a straight chain saturated polyester having an average molecular weight of from 1000 to 50000. The composition is prepared by the bulk-suspension two stage polymerization of vinyl aromatic monomer and vinyl cyanide monomer in the presence of butadiene rubber component. The polyester is incorporated during either the bulk polymerization stage or the suspension polymerization stage, or it is blended with the ABS polymer after the two stage polymerization is completed.

Generally, the rubber dispersed in ABS resin compositions heretofore considered to be well balanced and well suited in physical properties for injection and extrusion molding is about 0.3 micron in average diameter particle size (hereafter referred to as "particle size" or "average particle size").

According to our invention, therefore, because the rubber dispersed in the ABS resin which is prepared by the bulk-suspension two-stage polymerization process becomes greater in average particle size than that heretofore used in injection or extrusion molding, the powder-molded products made therefrom possess greater impact strength; and when this ABS resin is mixed with a straight chain saturated polyester, the resulting composition possesses even greater impact resistance.

When an ABS resin containing dispersed rubber particles of average particle size less than 0.3 microns (as has been used heretofore with ABS resin compositions for injection molding and for extrusion), even when blended with a straight chain saturated polyster, is powder-molded, it does not afford products greatly improved in impact strength.

Thus the ABS resin composition made in accordance with this invention possesses unexpectedly greater impact strength because of a kind of synergistic effect produced by the combination of the critically larger average particle size of the dispersed rubber and the presence of the straight chain saturated polyester.

BRIEF DESCRIPTION OF THE DRAWING

The drawing is a graph showing the relationship between the Izod impact strength and the average particle size of the dispersed rubber particles in both cases A and B. Curve A shows the ABS resin composition which is made by the bulk-suspension two-stage polymerization process and which contains in it a straight chain saturated polyester. Curve B shows another ABS resin, also made by the bulk-suspension two-stage polymerization process, but which does not contain in it a straight chain saturated polyester.

The drawing also shows that the ABS resin composition according to the invention, which contains a straight chain saturated polyester and in which the average particle size of the rubber dispersed is 0.5 micron or more, preferably 0.6 micron or more in average particle size, possesses markedly higher impact strength. The ABS resin composition containing dispersed rubber particles of more than 0.5 micron in average particle size, but containing no straight chain saturated polyester, possesses only slightly improved impact strength.

In the manufacture of ABS resin compositions by the bulksuspension polymerization process, we earlier discovered that an ABS resin composition, when prepared with a straight chain saturated polyester added in advance to the polymerization system, has dispersed rubber whose particle size is sufficiently enlarged as to make the resulting resin excellent to be used for powder molding. Our present invention, however, shows that, provided the ABS resin composition contains in it dispersed rubber adjusted in particle size to be in the critical range of 0.5 to 2.0 microns, it is not necessary that the straight chain saturated polyester be added in advance to the polymerization system. In other words, the polyester can be added during the bulk-polymerization process or during the suspension-polymerization process, or it can be blended into the ABS polymer after polymerization is complete.

Further, the ABS resin composition, whose dispersed rubber is 0.5 to 2.0 microns in particle size, and which is produced by the bulk-suspension polymerization process, can be blended with the straight chain saturated polyester in an extruder, roll blender or Banbury mixer. The pellets or powdered resin finally obtained by these processes can be used for powder molding with excellent results. Hence, in obtaining the new resin composition of this invention, the stage at which the straight chain saturated polyester is added is not critical.

The preferred production process for manufacturing the new impact-resistant resin composition for powder molding according to this invention is as follows:

A butadiene rubber polymer is dissolved in a mixture of a vinyl aromatic monomer and a vinyl cyanide monomer. To this solution, there are added a known organic peroxide catalyst as a radical initiator, a known mercaptan as a molecular weight regulating agent, and other conventional additives. If necessary, a small amount of water is further added thereto to increase its thermal conductivity. Then, bulk-polymerization is performed on the mixture thus produced with controlled stirring until 10 to 40 percent of polymerizable monomers are converted into polymers and the rubber dispersion phase is formed as well. Then the resulting mixture is poured into water which contains a dispersing agent suspended therein for suspension polymerization. The suspension polymerization is effected on the mixture with stirring and heating at a predetermined temperature.

In manufacturing the new resin composition according to this invention, it is important that the dispersed rubber should be formed in the average particle size of 0.5 to 2.0 microns.

Obtaining dispersed rubber having the desired average particle size (0.5 to 2.0 microns) depends upon the time of bulk-polymerization, the reaction rate of bulk-polymerization and the conditions of suspension-polymerization, but particularly upon the shape of the mixing blades of the stirrer working in the polymerization vessel and the revolutions per minute of the stirrer.

When the dispersed rubber is formed in the average particle size of below 0.5 micron, then powder-molded products of the ABS resin composition containing this dispersed rubber are not improved in impact strength. When the dispersed rubber is formed in the average particle size of more than 2.0 microns, then powder-molded products of the ABS resin having this dispersed rubber are insufficient in mechanical properties, such as rigidity, and the like.

Accordingly, it is important in this invention that the dispersed rubber is formed in the average particle size of 0.5 to 2.0 microns, and also that 1 to 10 percent of the straight chain saturated polyester is incorporated with the graft copolymer.

The straight chain saturated polyester used in this invention is a condensate of a dibasic acid and a glycol or a ring-opening polymer of a cyclic lactone, such as ε-caprolactone, pivalolactone, and laurolactone. More precisely, the condensate is obtained by the condensation reaction of dibasic acids, such as adipic acid, sebacic acid, azelaic acid, and phthalic acid, with glycols, such as ethylene glycol, propylene glycol and 1,3-butylene glycol. These are the condensates generally known as plasticizers for polyvinyl chloride. Further, modified polyethylene terephthalates which mainly comprise terephthalic acid and ethylene glycol can be used.

The straight chain saturated polyester should have an average molecular weight which ranges between 1,000 and 50,000, because a polyester having an average molecular weight below 1,000 does not exert its effect fully, whereas a polyester having an average molecular weight of more than 50,000 also does not bring about the desired effect because the polyester in the latter case is not dispersed uniformly because of its poor compatibility with the ABS resin composition.

The straight chain saturated polyester should be added at the ratio of 1 to 10 parts by weight of polyester per 100 parts by weight of the graft copolymer. If the polyester is used in a quantity of less than 1 part, the effect thereof is not sufficient whereas if the polyester is added in a quantity over 10 parts, the heat distortion temperature is decreased substantially.

Further, lower molecular weight plasticizers can be added, such as phthalates, phosphoric acid esters, and stearates. However, care should be taken in using these plasticizers because, when used excessively they tend to lower the heat resistance and the rigidity, and the like of the resin composition.

The preferred vinyl aromatic monomer in this invention is styrene. However, substituted styrene derivatives, such as α-methylstyrene, and β-methylstyrene, can also be used. A mixture of these derivatives with the styrene can be used as well.

The preferred vinyl cyanide monomer is acrylonitrile. Methacrylonitrile, and so forth, can also be used.

There is no particular limitation on the mixing weight ratio of the vinyl aromatic monomer with the vinyl cyanide monomer. However, it is preferred to employ a ratio of 60 to 90 weight percent of vinyl aromatic monomer to 40 to 10 weight percent of vinyl cyanide monomer.

Rubber components which are generally used for the manufacture of impact-resistant polymers can also be used. Particularly desirable are butadiene rubbers such as polybutadiene and butadiene-styrene copolymers which are comparatively high in stereoregularity and which are manufactured by the solution polymerization process in the presence of lithium or organometallic catalyst.

No particular limitation is applicable to the weight ratio of (A) the monomer composition, (which consists of the vinyl aromatic monomer and the vinyl cyanide monomer), with (B) the rubber component. The preferred mixing ratio, however, is about 2 to 40 parts by weight of the rubber component to 100 parts by weight of the monomer mixture.

The preferred resin composition is that described above consisting essentially of the copolymer graft copolymerized onto the critically sized rubber particles dispersed therein, and the polyester. It can include minor and conventional amounts of initiators, control agents, suspending agents, dispersing agents and the like.

No specific limitation is applicable to the type and amount of initiators for polymerization and agents for regulating molecular weight. Initiators and regulating agents which are well-known can be employed. Depending on the polymerization conditions, a given amount of these chemical agents divided into parts can be added at the stages of the bulk-polymerization and of the suspension-polymerization process.

Similarly, any suspension or dispersing agents can be used. For example, such protective colloids as polyvinyl alcohol and sodium polyacrylate, or such finely divided particles of inorganic salts as calcium phosphate and magnesium hydroxide, can be used.

Further, the polymerization temperatures are not specifically defined. Preferably, however, the bulk-polymerization is effected at 60° to 100°C, and the suspension-polymerization at 60° to 140°C.

The optimum conditions adopted in this invention for the two-stage bulk-suspension polymerization are described in Japanese laid-open Patent Application No. Showa 48-10162. The conditions are as follows:

1. Polybutadiene or butadiene-styrene copolymer prepared by the solution polymerization process in the presence of an organometal polymerization catalyst is used as a rubber polymer.
2. One or more liquid paraffin, phthalate and stearate are added in advance to the polymerization stystem.
3. The bulk-polymerization is carried out at a temperature below 100°C, preferably at 65° to 80°C.
4. The suspension-polymerization performed at a temperature below 120°C.

The invention is further described by reference to the following illustrative examples as well as the comparative examples in the following:

The term "part" mentioned in the examples that follow means "part by weight". Also, the following conditions were adopted in preparing molded products for testing and in evaluating the physical properties of the molded products:

1. Powder polymer which passed through a 30-mesh sieve was shaped by a rotational molding machine of the McNeil type into the form of a cylinder 200 mm in diameter, 200 mm in length and 10 mm in wall thickness, under the conditions indicated in Table 1.

Table 1

| Mold | | Conditions for Rotational Molding Heating | | | | Cooling |
|---|---|---|---|---|---|---|
| Shape | Material | Temp. °C | Time min. | Rotation | Revolution | water spraying |
| Cylinder | Iron | 320 | 25 | 4 rpm | 8 rpm | 8 min. |

2. The cylindrical product, molded under the foregoing conditions was cut into test pieces, which then were tested by the following methods:

| Tensile strength and elongation: | ASTM D638-71a (Tensile velocity 5 mm/min.) |
| Izod impact strength: | ASTM D256-72a |
| Deflection temperature under heat: | ASTM D68a (Fiber stress 18.56 kg) |

3. Dispersed rubber particles were dyed by the osminium method and then photographed using an electron microscope. The pictures indicated that the dispersed rubber particles had various shapes of circular, elliptical, and various deformed shapes. The particle size of the dispersed rubber particles was determined by the following method:

The maximum diameter, for example, of an elliptical shape is defined as "a", and another diameter which passes through the center of "a" and is perpendicular thereto is named as "b". The mean value of "a" and "b" was termed the "particle size r". Therefore, $$r = \frac{(a+b)}{2}$$

More than 100 of the dispersed rubber particles were measured to obtain an "average particle size r" as shown below:

$$\bar{r} = \left(\sum_{i=1}^{m} n_i \ r_i\right) \bigg/ \left(\sum_{i=1}^{m} n_i\right)$$

wherein, $n_i$ shows the number of particles of the particle size $r_i$.

EXAMPLE 1

Thirteen parts of Solprene 1204 (A.A. Chemical Corporation), which is a styrene-butadiene random copolymer rubber composed of 25 weight percent styrene and 75 weight percent butadiene, were mixed with 75 parts of styrene monomer, 25 parts of acrylonitrile, 0.15 part of benzoyl peroxide, 0.08 part of dicumyl peroxide, 0.37 part of t-dodecylmercaptan, and 3 parts of butylbenzylphthalate, and completely dissolved with agitation.

Then, to this reaction mixture was added 20 parts of deionized water. The mixture was polymerized in a polymerization vessel provided with a powderful stirring mechanism such as described in U.S. Ser. No. 356,145, now U.S. Pat. No. 3,883,616, at 73°C for 4 hours with its revolutions per minute properly controlled so as to keep the peripheral speed of the propeller at 400 m/min.

To the foregoing mixture undergoing polymerization there was further added 3 parts of straight chain saturated polyester, whose average molecular weight was 3,000, and polymerization was continued for 30 additional minutes. About 25 percent of the monomers were thereby converted into polymer. The polyester PN-350 manufactured by Adeka-Argus Corporation was used; the PN-350 is a condensate of adipic acid and 1,3-butyleneglycol.

An aqueous mixture comprising 100 parts of deionized water and 3 parts of magnesium hydroxide was prepared in another vessel. The foregoing polymerization reaction mixture was added to the aqueous mixture. The resulting suspension was heated from 65°C to 120°C for one hour and 30 minutes, and further reacted with agitation at 120°C for 5 hours to obtain a polymer slurry. The slurry was washed with hydrochloric acid and water, subjected to centrifugal dehydration and dried. The rubber dispersed in the thus-produced ABS resin composition had an average particle size of 0.62 micron.

resin composition finally produced had an average particle size to 0.43 microns.

Table 3

| Resin | Average particle size of | Physical properties of rotationally molded products | | | | | |
|---|---|---|---|---|---|---|---|
| | | Tensile strength and elongation | | | Izod Impact Strength | | Deflection temperature under heat °C |
| | | Strength at yield point Kg/cm² | Strength at breaking point Kg/cm² | Elongation at breaking point % | with notch Kg.cm/cm | without notch Kg.cm/cm | |
| Example 2 | 0.65 | 313 | 264 | 26 | 8 | 39 | 71 |
| | 0.77 | 271 | 234 | 34 | 9 | 36 | 68 |
| | 0.97 | 258 | 223 | 28 | 10 | 33 | 69 |
| | 1.12 | 241 | 209 | 25 | 11 | 30 | 67 |
| | 1.35 | 211 | 197 | 18 | 11 | 28 | 67 |
| Comparative Example 2 | 0.43 | — | 325 | 18 | 2 | 14 | 71 |

COMPARATIVE EXAMPLE 1

Bulk-suspension polymerization was carried out in precisely the same way as in Example 1, except that no straight chain saturated polyester was added, and also that the bulkpolymerization was performed at 73°C for 4 hours and 30 minutes. The rubber dispersed in the ABS resin composition thus produced had an average particle size of 0.60 micron.

The ABS resin composition obtained in Example 1 and Comparative Example 1 were rotationally molded into products, which then were tested for physical properties as summarized in Table 2.

Table 2

| Resin | Average particle size of rubber r̄ (microns) | Physical Properties of Products Rotationally Molded | | | | | |
|---|---|---|---|---|---|---|---|
| | | Tensile strength and elongation | | | Izod Impact strength | | Deflection temperature under heat |
| | | Strength at yield point | Strength at breaking point | Elongation at breaking point | with notch | without notch | |
| | | Kg/cm² | Kg/cm² | % | Kg cm/cm | Kg cm/cm | °C |
| Example 1 | 0.62 | 323 | 284 | 23 | 6 | 27 | 67 |
| Comparative Example 1 | 0.60 | — | 251 | 17 | 3 | 9 | 73 |

EXAMPLE 2

The polymerization was performed exactly the same way as in Example 1 except the rubber dispersed in the ABS resin composition was enlarged in average particle size to the extent of 0.65, 0.77, 0.97, 1.12 and 1.35 microns in that order, by controlling properly the revolutions per minute of the stirrer used in the bulk-polymerization process.

COMPARATIVE EXAMPLE 2

The polymerization was conducted in exactly the same way as in Example 1 except that the stirrer used in the bulkpolymerization was operated faster in revolutions per minute and the rubber dispersed in the ABS resin composition finally produced had an average particle size to 0.43 microns.

EXAMPLE 3

Three parts of polycaprolactone having an average molecular weight of 15,000 were mixed in a blender with 100 parts of the resin composition obtained in Comparative Example 3, and the resulting material was uniformly kneaded by an extruder. The material was then pelletized and pulverized. The powder was rotationally molded into products. The polycaprolactone PCL-300 made by Union Carbide Corporation was used.

COMPARATIVE EXAMPLE 3

The polymerization was carried out exactly in the same way as in Comparative Example 1 except that the stirrer used in the bulk-polymerization was slowed down in revolutions per minute, and the rubber dispersed in the ABS resin composition had an average particle size of 1.25 micron.

COMPARATIVE EXAMPLE 4

The polymerization was effected exactly in the same way as in Comparative Example 1, except that the stirrer used in the bulk-polymerization was operated faster in revolutions per minute, and the rubber dispersed in the ABS resin composition finally produced had an average particle size of 0.43 micron. The resulting ABS resin composition was blended in the method similar to Example 3 with three parts of polycaprolactone per 100 parts of resin. The blended material was kneaded, pelletized and pulverized in the same way as in Example 3. The powder was also rotationally molded into products.

The foregoing products in Example 3 and Comparative Examples 3 and 4 were tested for physical properties as indicated in Table 4.

Table 4

| Resin | Average particle size of rubber r̄ (microns) | Physical Properties of Products Rotationally Molded — Physical properties of rotationally molded products | | | | | |
|---|---|---|---|---|---|---|---|
| | | Tensile strength and elongation | | | Izod Impact strength | | Deflection temperature under heat |
| | | Strength at yield point Kg/cm² | Strength at breaking point Kg/cm² | Elongation at breaking point % | with notch Kg.cm/cm | without notch Kg.cm/cm | °C |
| Example 3 | 1.25 | 232 | 207 | 47 | 9 | 44 | 68 |
| Comparative Example 3 | 1.25 | — | 142 | 11 | 6 | 13 | 67 |
| Comparative Example 4 | 0.43 | — | 286 | 20 | 5 | 15 | 69 |

The drawing shows the relation between the average particle size of rubber dispersed in an ABS resin composition and the Izod impact strength of products rotationally molded from the ABS resin composition.

The ABS resin composition indicated by the curve A contains in it a straight chain saturated polyester and is prepared by the bulk-suspension process, and the other ABS resin composition shown by the curve B does not contain in it a straight chain saturated polyester, but it also is manufactured by the bulk-suspension process.

The embodiments of the invention in which an exclusive property or privilege is claimed and defined as follows:

1. An impact-resistant ABS resin composition capable of being molded by fusing particles of said resin composition under conditions of low shear, in which the resin components consist essentially of a mixture of
   A. a graft copolymer obtained by polymerizing under bulk polymerization conditions, with stirring, a solution of a rubbery component selected from the group consisting of polybutadiene and butadiene-styrene copolymer, dissolved in a mixture of vinyl aromatic monomer and vinyl cyanide monomer, until from 10 to 40 percent of said monomers are polymerized and a dispersed rubber phase is formed; and then adding the reaction mixture to water containing a dispersing agent suspended therein and completing polymerization of said monomer, with stirring, under suspension polymerization conditions to obtain a graft copolymer in which said monomers are graft copolymerized onto particles of said rubbery component wherein the average particle size of said rubbery component in the graft copolymer is in the range of 0.5 to 2.0 microns
   B. a straight chain saturated polyester formed by condensing a dibasic acid with a glycol, said polyester having an average molecular weight of from 1000 to 5000, the amount of said polyester being in the range of from 1 to 10 parts by weight, per 100 parts by weight of said graft copolymer, said polyester being added during the bulk polymerization stage, or during the suspension polymerization stage, or after polymerization is complete.

2. The composition of claim 1 which is made by adding the polyester to the polymerization system during the bulkpolymerization stage.

3. The composition of claim 1 which is made by adding the polyester to the polymerization system during the suspension polymerization stage.

4. The composition of claim 1 which is made by blending the polyester with the graft copolymer after polymerization is complete.

5. The composition of claim 1, in which the vinyl aromatic monomer is a member selected from the group consisting of styrene, α-methyl styrene, β-methyl styrene, and mixtures thereof.

6. The composition of claim 5, in which the vinyl cyanide monomer is a member selected from the group consisting of acrylonitrile and methacrylonitrile.

7. The composition of claim 1, in which the ratio of mixing vinyl aromatic monomer with vinyl cyanide monomer is 60 to 90 weight percent of vinyl aromatic monomer to 40 to 10 weight percent of vinyl cyanide monomer.

8. The composition of claim 7, in which the ratio of mixing the rubber component with the monomer mixture is 2 to 40 parts of rubber component to 100 parts of monomer mixture.

9. The composition of claim 8 in which the bulk polymerization is effected at 60° to 100°C and the suspension polymerization effected at 60° to 140°C.

10. The composition of claim 1, in which the dibasic acid is a member selected from the group consisting of adipic acid, sebacic acid, azelaic acid, and phthalic acid.

11. The composition of claim 1, in which said glycol is a member selected from the group consisting of ethylene glycol, propylene glycol and 1,3-butylene glycol.

12. The composition of claim 1, in which said polyester is a condensate of terephthalic acid and ethylene glycol.

* * * * *